US007019741B2

(12) United States Patent
Kelly et al.

(10) Patent No.: US 7,019,741 B2
(45) Date of Patent: Mar. 28, 2006

(54) METHODS AND SYSTEMS FOR SIMULATING ANIMATION OF WEB-BASED DATA FILES

(75) Inventors: Ann Elizabeth Kelly, Albany, NY (US); Thomas Michael Cox, Fairfield, OH (US); Hale James Husband, Mason, OH (US); George Ludlow Ryan, IV, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 599 days.

(21) Appl. No.: 09/815,492

(22) Filed: Mar. 23, 2001

(65) Prior Publication Data

US 2002/0135580 A1 Sep. 26, 2002

(51) Int. Cl.
*G06T 15/00* (2006.01)

(52) U.S. Cl. ...................................................... 345/419

(58) Field of Classification Search ................ 345/473, 345/419, 474, 349, 418; 709/200, 230; 707/501
See application file for complete search history.

(56) References Cited

U.S. PATENT DOCUMENTS 5,873,057 A * 2/1999 Eves et al. .................. 704/201
6,011,537 A 1/2000 Slotznick
6,046,689 A 4/2000 Newman
6,081,278 A 6/2000 Chen
6,088,731 A * 7/2000 Kiraly et al. ............... 709/229
6,112,246 A 8/2000 Horbal et al.
6,144,991 A 11/2000 England
6,157,864 A 12/2000 Schwenke et al.
6,157,924 A 12/2000 Austin
6,157,933 A 12/2000 Celi, Jr. et al.
6,167,394 A 12/2000 Leung et al.
6,167,404 A 12/2000 Morcos et al.
6,169,547 B1 1/2001 Tanaka et al.
6,177,945 B1 * 1/2001 Pleyer ........................ 345/473
6,178,432 B1 1/2001 Cook et al.
6,178,439 B1 * 1/2001 Feit ............................ 709/200
6,199,060 B1 3/2001 Gustman
6,201,897 B1 3/2001 Nixon
6,215,495 B1 4/2001 Grantham et al.
6,216,152 B1 4/2001 Wong et al.
6,232,976 B1 5/2001 Dalal et al.
6,240,450 B1 * 5/2001 Sharples et al. ............ 709/224
6,243,093 B1 6/2001 Czerwinski et al.
6,243,104 B1 6/2001 Murray
6,243,856 B1 6/2001 Meyer et al.
6,250,930 B1 6/2001 Mintz
6,263,265 B1 7/2001 Fera
6,278,455 B1 8/2001 Baker
6,377,263 B1 * 4/2002 Falacara et al. ............ 345/473
6,433,784 B1 * 8/2002 Merrick et al. ............. 345/473
6,480,191 B1 * 11/2002 Balabanovic ............... 345/419
6,483,512 B1 * 11/2002 McKeeth .................... 345/473

* cited by examiner

*Primary Examiner*—Thuy V. Tran
*Assistant Examiner*—Huedung X. Cao
(74) *Attorney, Agent, or Firm*—William Scott Andes; Armstrong Teasdale LLP

(57) ABSTRACT

A web-based system that displays a plurality of web-based data files in a simulated animated format in a cost-effective and reliable manner is described. The web-based system includes a client system including a browser, a data storage device for storing the plurality of web-based data files, and a server system accessible by the client system and coupled to the database. The browser includes a viewer that sequentially displays the plurality of web-based data files to simulate an animation effect. The viewer creates an interactive animation of the web-based data files that is viewable without using additional browser plug-in software.

19 Claims, 5 Drawing Sheets

160 156 152 152 152 152 152 152

METHODS AND SYSTEMS FOR SIMULATING ANIMATION OF WEB-BASED DATA FILES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to web-based systems, and more specifically to methods and systems for displaying web-based data files.

The collections of computer networks known as the Internet and World Wide Web have produced a dramatic improvement in electronic communications and information accessibility. Using remote terminals and local area networks connected with the Internet, individuals and organizations are now able to easily access web-based data files. More specifically, many individuals and organizations conduct extensive research and testing via Internet web browsers prior to purchasing, disassembling, or replacing equipment.

For example, users of gas turbine engines, often research potential upgrade components for compatibility prior to replacing existing components. As the complexity of the gas turbine engines has increased, so has the demand to receive detailed information regarding components. Depending on the type of web-based file being accessed, users must acquire software tools in addition to the web browser, for the specific purpose of viewing interactive animations. Within many organizations, the ability to install software is controlled to prevent inappropriate or incompatible software from being inadvertently installed to a network. Furthermore, depending on a bandwidth of the network connection, downloading or accessing such software may be a time-consuming task. As a result, installing web-browser plug-in software may be a formidable task. Furthermore, known non plug-in animation solutions do not provide the user with the ability to control the animation, e.g. forward motion, reverse motion, pause the animation, etc., and thus, limit a viewing opportunities of users.

BRIEF SUMMARY OF THE INVENTION

In an exemplary embodiment, a web-based system displays a plurality of web-based data files in an animated format, and in a cost-effective and reliable manner. The web-based system includes a client system including a browser, a data storage device for storing the plurality of web-based data files, and a server system coupled to the database and accessible by the client system. The browser includes a viewer that sequentially displays the plurality of web-based data files to simulate animation of the web-based data files.

The viewer creates an interactive animation of the web-based data files that enables a user to view the animation without installing additional browser plug-in software. Additionally, the web-based system permits the user to control the animation, including a direction of the animation, a speed of the animation, and an activation of the animation. Because no additional plug-in software is required the viewer is compatible with low bandwidth network connections. As a result, web-based data files are simulated in an animated display using a web-based system that is cost-effective and highly reliable.

DETAILED DESCRIPTION OF THE INVENTION

Exemplary embodiments of systems and processes that facilitate displaying web-based data files are described below in detail. The systems and processes facilitate, for example, displaying web-based data files in a simulated animated format. The systems and processes are not limited to the specific embodiments described herein. In addition, components of each system and each process can be practiced independently and separately from other components and processes described herein. Each component and process can also be used in combination with other components and processes.

Figure 1:
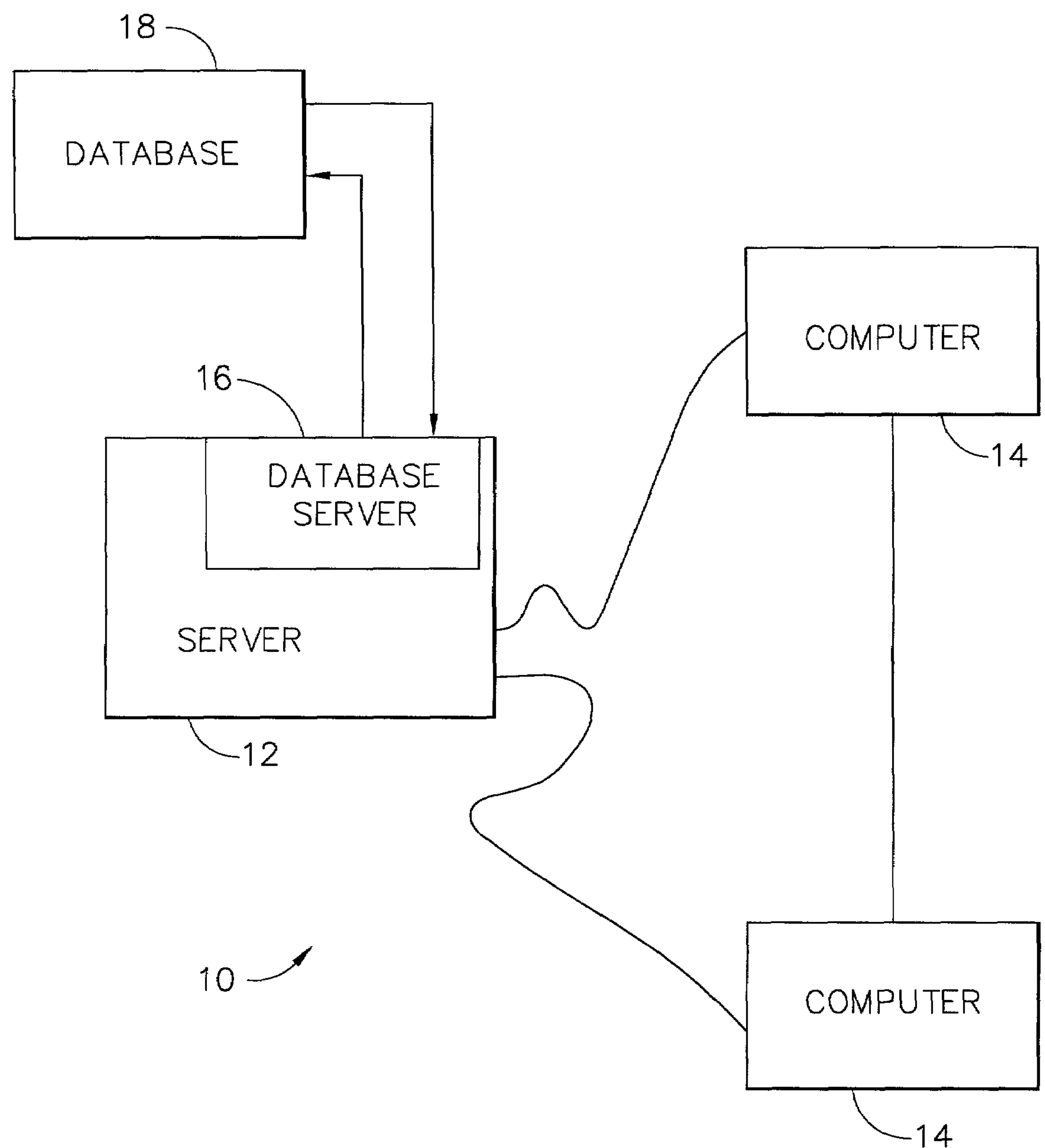
FIG. 1 is an exemplary embodiment of a block diagram of a system for simulating animation of web-based data files.

FIG. 1 is an exemplary block diagram of a system 10 for displaying web-based data files. In the exemplary embodiment, system 10 displays data files related to aircraft engine components. System 10 includes a server 12 and a plurality of devices 14 connected to server 12. In one embodiment, devices 14 are computers including a web browser, and server 12 is accessible to devices 14 via the Internet. In an alternative embodiment, devices 14 are servers for a network of customer devices. System 10 is coupled to a mass storage device (not shown). In the exemplary embodiment, server 12 includes a database server 16 coupled to a data storage device 18.

Devices 14 are interconnected to the Internet through many interfaces including through a network, such as a local area network (LAN) or a wide area network (WAN), through dial-in-connections, cable modems and special highspeed ISDN lines. Alternatively, devices 14 could be any device capable of interconnecting to the Internet including a web-based phone or other web-based connectable equipment. A database providing enclosure information is stored on server 12 and can be accessed by users at one of devices 14 by logging onto server 12 through one of devices 14.

System 10 is configured to provide various user interfaces whereby users access web-based data files. More specifically, in the exemplary embodiment, system 10 is configured to provide a plurality of users access to web-based data files regarding gas turbine engine components. Server 12 accesses stored information and downloads the requested information to at least one of the client systems 14, when the request to download is received from client system 14. The databases are accessed by users using client system 14 configured with a standard web browser.

Figure 2:
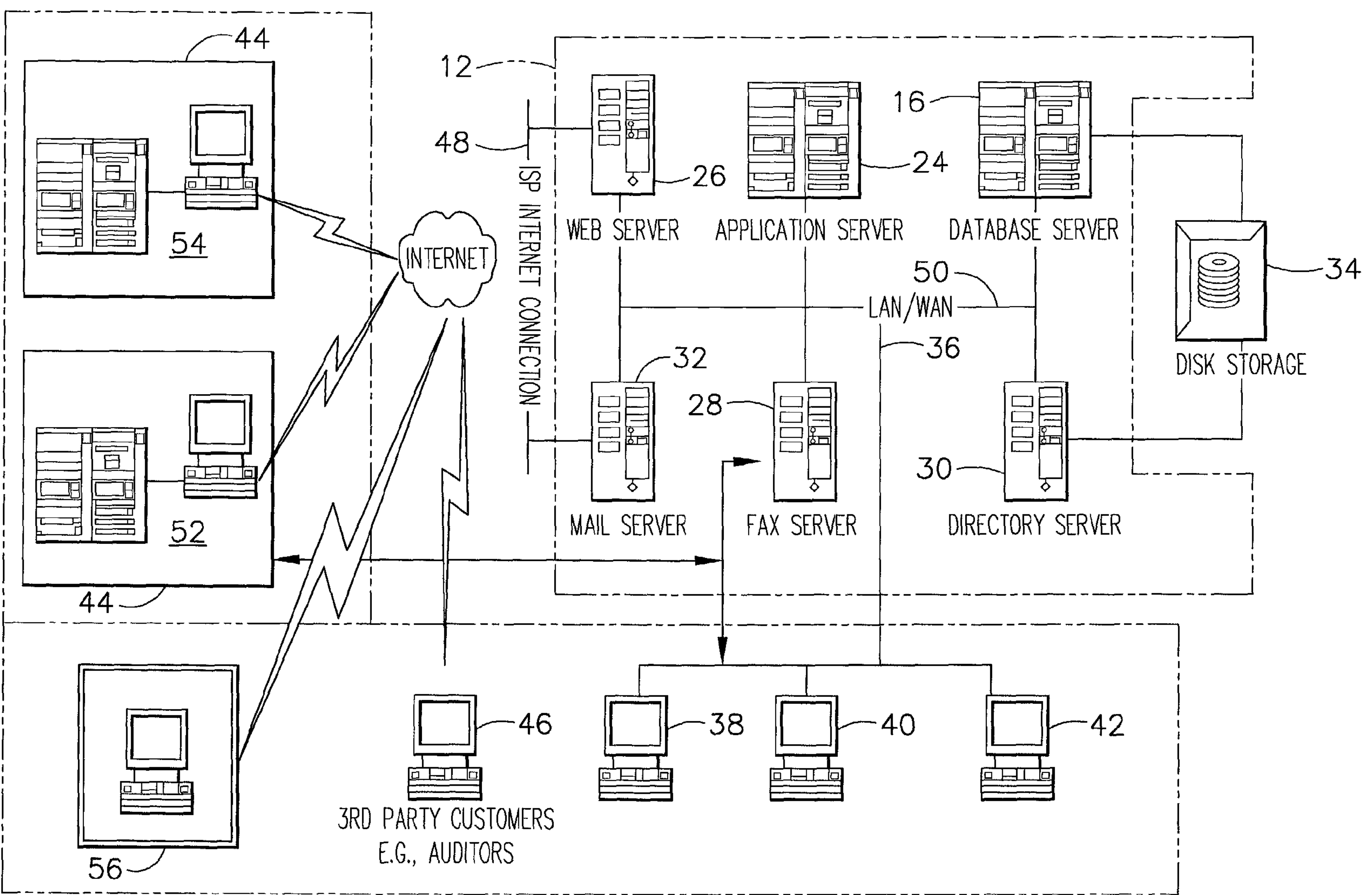
FIG. 2 is an expanded version block diagram of a server architecture of a system in accordance with one embodiment of the present invention.

FIG. 2 is an expanded version block diagram of an exemplary embodiment of a server architecture of a system 22 for displaying web-based data files. Components of system 22, identical to components of system 10 (shown in FIG. 1), are identified in FIG. 2 using the same reference numerals as used in FIG. 1. System 22 includes server sub-system 12 and user devices 14. Server sub-system 12 includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator workstation 38, a user workstation 40, and a supervisor workstation 42 are coupled to LAN 36. Alternatively, workstations 38, 40, and 42 are coupled to LAN 36 via an Internet link or are connected through an intranet.

Each workstation 38, 40, and 42 is a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

In another embodiment, server sub-system 12 is configured to be communicatively coupled to various individuals or employees 44 and to users 46 via an ISP Internet connection 48. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than a WAN 50, local area network 36 could be used in place of WAN 50.

In the exemplary embodiment, any authorized individual or an employee of the business entity having a workstation 52 can access server sub-system 12. One of user devices 14 includes a senior manager's workstation 54 located at a remote location. Workstations 52 and 54 are personal computers having a web browser. Also, workstations 52 and 54 are configured to communicate with server sub-system 12. Furthermore, fax server 28 communicates with employees located outside the business entity and any of the remotely located user systems, including a user system 56 via a telephone link. Fax server 28 is configured to communicate with other workstations 38, 40, and 42 as well.

Figure 3:
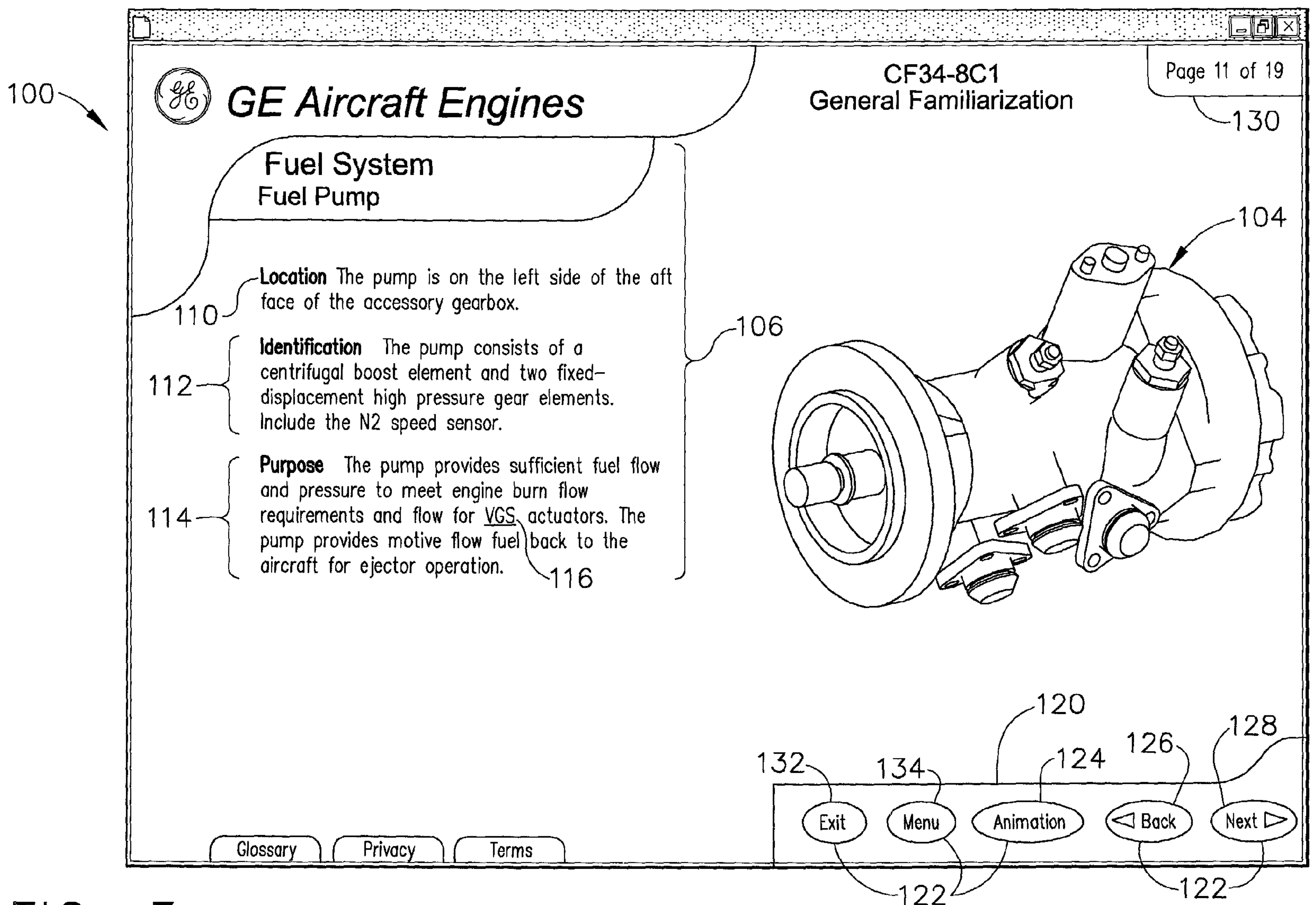
FIG. 3 is an exemplary embodiment of a web page used with the system shown in FIGS. 1 and 2 for displaying web-based data files.

FIG. 3 is an exemplary embodiment of a web page 100 used with either system 10 (shown in FIG. 1) or system 22 (shown in FIG. 2). In the exemplary embodiment, systems 10 and 22 accumulate a variety of web-based data files concerning business information that is highly confidential or proprietary. More specifically, in the exemplary embodiment, systems 10 and 22 accumulate data files pertinent to aircraft engine components available from General Electric Company, Cincinnati, Ohio. Therefore, each system 10 and 22 has different access levels to control and monitor the security of each respective system 10 and 22. Authorization for access is assigned by system administrators on a need to know basis. In an alternative embodiment, access is based on job function. In a further embodiment, access is based on a user's position and management authority within the business entity.

Prior to accessing web page 100, a user selects a component to be displayed. In one embodiment, pull-down menus enable a user to select a component to be displayed. For example, in the exemplary embodiment, the component selected for display is a fuel system fuel pump for a CF34 turbine engine. After the user has selected the component to be displayed, a perspective view 104 of the component selected is displayed. Additionally, a description 106 of the component selected is provided to the user. In the exemplary embodiment, description 106 includes information regarding a location 110 of the component, an identification 112 of the component, and a general purpose 114 of the component. Furthermore, in the exemplary embodiment, description 106 includes hyperlink text 116 that enables a user to additional details relevant to the component selected for display. Alternatively, component description 106 includes other information.

Web page 100 also includes a control panel 120. Control panel 120 includes a plurality of push buttons 122 that enable a user to control the I-component being displayed. More specifically, selecting an "Animation" button 124 activates a viewer (not shown in FIG. 3) which displays the component selected in an animation format. A "Back" button 126 and a "Next" button 128 permit a user to select other components that are pre-loaded into system 10 or 22. More specifically, when "Back" and "Next" buttons 126 and 128, respectively, are activated, perspective views 104 and descriptions 106 of other components pre-loaded in system 10 or 22 are displayed, such that an alternative component may be selected for display. A monitor bar 130 indicates a page number of the component currently displayed within web page 100. Control panel 120 also includes an "Exit" button 132 and a "Menu" button 134. Selecting "Exit" button 132 closes web page 100, and selecting a "Menu" button 134 returns a user to an initial menu screen (not shown).

Figure 4:
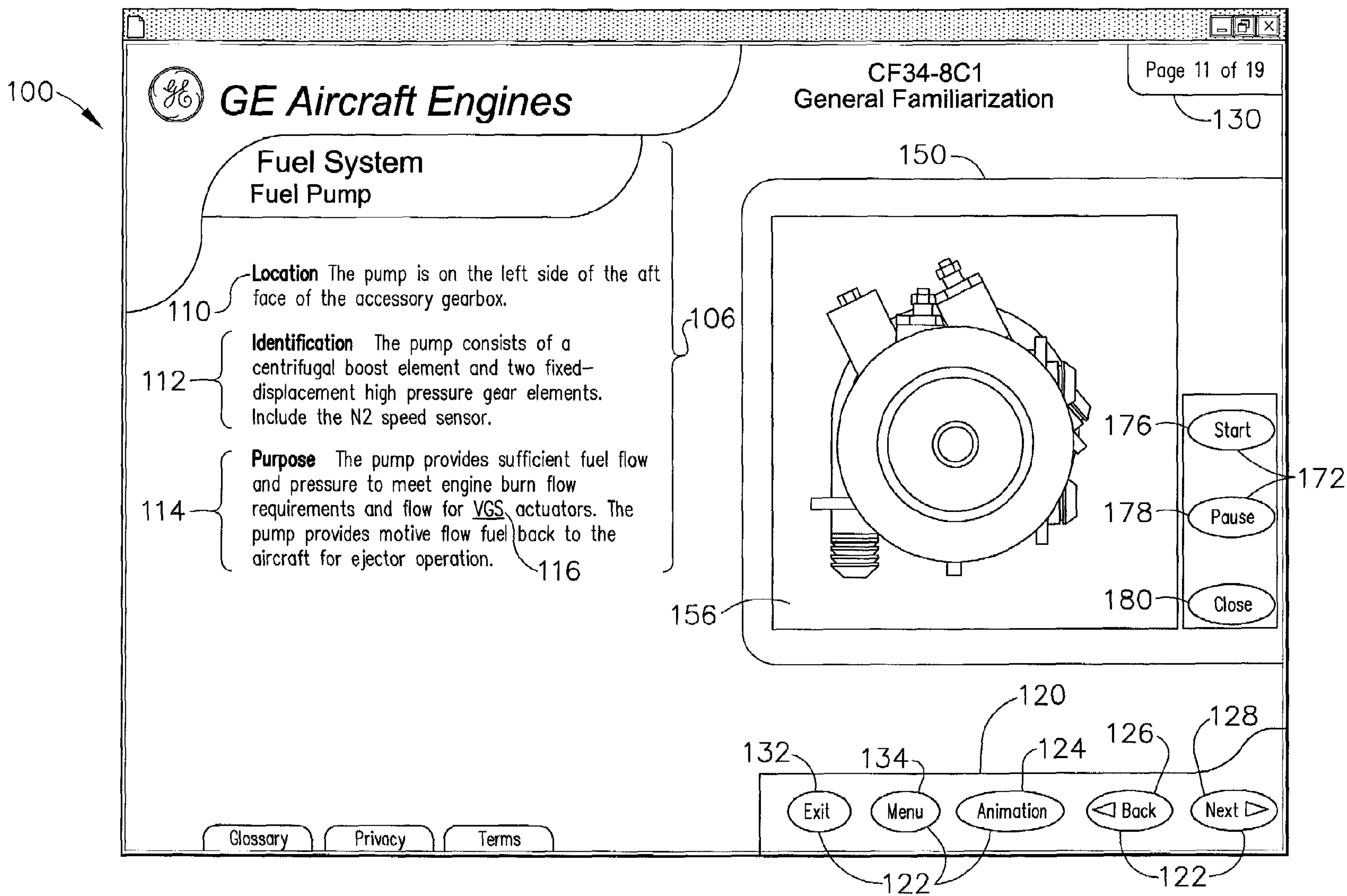
FIG. 4 is an exemplary embodiment of the web page shown in FIG. 3 and including a viewer for displaying web-based data files in a simulated animated format.
Figure 5:
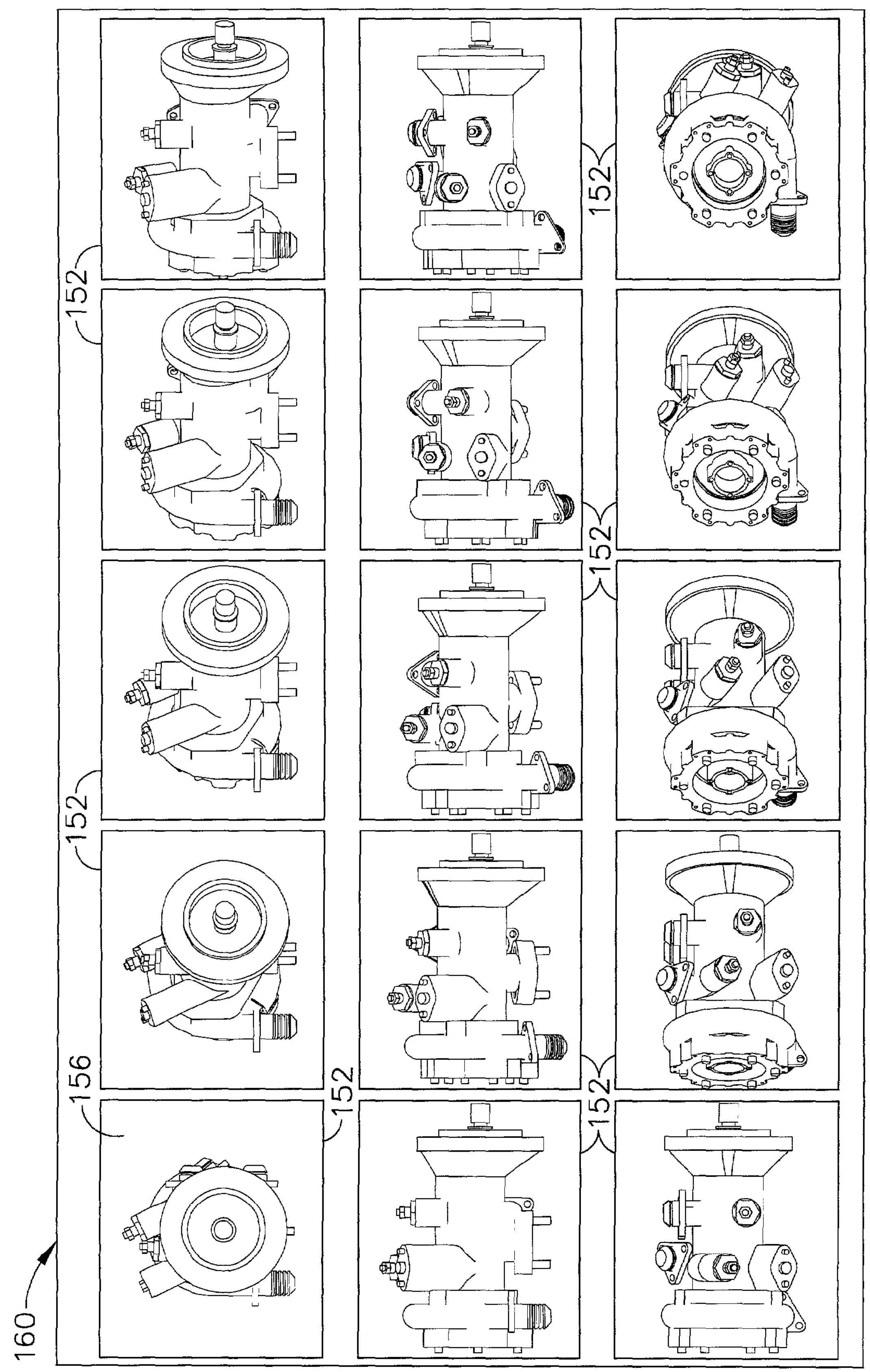
FIG. 5 is an exemplary embodiment of a plurality of animation frames displayed sequentially with the viewer shown in FIG. 5.

FIG. 4 is an exemplary embodiment of web page 100 including a viewer 150 for displaying a plurality of web-based data files in a simulated animated format. FIG. 5 is an exemplary embodiment of a plurality of animation frames 152 displayed with viewer 150 (shown in FIG. 4). When "Animation" button 124 is selected, viewer 150 is activated, and component perspective view 104 (shown in FIG. 3) is replaced with viewer 150 and an initial animation frame 156 of the component is displayed within viewer 150.

Viewer 150 creates an interactive animation of frames 152 within web-page 100. More specifically, viewer 150 permits a simulated interactive animation to be displayed without the use of browser plug-in software. As a result, a user need not acquire any additional plug-in software for the specific purpose of playing interactive animations. Furthermore, because no additional plug-in software is utilized, viewer 150 is compatible with low bandwidth network connections.

Animation frames 152 are arranged in a sequential order 160 prior to being displayed with viewer 150. In one embodiment, animation frames are in JPEG file format. More specifically, each subsequent frame 152 depicts the component at a slightly different orientation relative to a previous frame 152. JavaScript code is used to display frames 152 within viewer 150 in sequence as defined within pattern 160, and thus creates a simulated motion or animation effect. Variables in the JavaScript code are used to control an amount of time delay between sequential displays of frames 152. Variables in the JavaScript are also used to determine which frames 152 are displayed, and what sequential order 160 frames 152 are displayed. Because each subsequent frame 152 is oriented at a slightly different orientation relative to a previous frame 152, as frames 152 are sequentially displayed, depending upon a time delay selected between sequential frames 152, viewer 150 provides a simulated animated effect.

Viewer 150 includes a control panel 170 including a plurality of push buttons 172 for controlling simulated display animation within viewer 150. More specifically, selecting a "Start" button 176 activates the sequential display of frames 152 and the simulated animated effect. In one embodiment, selecting "Start" button 176 provides a user an option of selecting a forward or a reverse sequential display of frames 152. A "Pause" button 178 stops the automatic sequential display of frames 152 and permits individual frames 152 to be displayed. In one embodiment, re-depressing "Pause" button 178 reactivates the sequential display of frames 152. A "Close" button 180 closes viewer 150 and returns the user to web page 152 and component perspective view 104.

The above-described web-based system is cost effective and highly reliable. The web-based system and methods permit a user to view web-based data file in a simulated animated format. More specifically, the web-page accessible by a plurality of users includes a viewer that sequentially displays a plurality of web-based data files to create an animated effect. The web-site includes an interactive control panel that permits a user to control the animated display. As a result, because no additional browser software is required, the web-based system is cost-effective and reliable.

While the invention has been described in terms of various specific embodiments, those skilled in the art will recognize that the invention can be practiced with modification within the spirit and scope of the claims.

What is claimed is:

1. A method for displaying web-based data files, said method comprising the steps of:

providing a centralized web structure for storing a plurality of individually saved web-based data files;

limiting access to the data files to authorized individuals;

storing the plurality of web-based files within the centralized web structure;

displaying the plurality of individually saved web-based data files in a simulated animated format on a web page, such that a user controls at least one of an animation speed, and an activation of the animation; and displaying a description of an object represented in the plurality of web-based data files on the web page simultaneously with the simulated animated format wherein the description includes at least one of a location of the component, an identification of the component, a general purpose of the component, and a hypertext link to additional information regarding the object.

2. A method in accordance with claim 1 wherein said step of displaying the plurality of web-based data files further comprises the step of displaying the plurality of web-based data files in a simulated animated format without using browser plug-in software.

3. A method in accordance with claim 2 wherein said step of storing the plurality of web-based files further comprises the step of storing a plurality of JPEG images within the centralized web structure.

4. A method in accordance with claim 3 wherein said step of displaying the plurality of web-based data files further comprises the step of arranging the plurality of data files in a sequential order.

5. A method in accordance with claim 4 wherein said step of arranging the plurality of data files further comprises the step of using JavaScript to determine the sequential order of the data files.

6. A customer applications web-site for displaying a plurality of data files in a simulated animated format, the data files individually saved and access to the data files is limited to authorized individuals, said web site including an interactive control panel configured to permit an end-user to control the animation display including at least one of a speed of animation and an activation of the animation display, and to display a description of an object represented in the plurality of individually saved web-based data files on the control panel simultaneously with the simulated animated format.

7. A web-site in accordance with claim 6 wherein said web-site further configured to display the plurality of data files in a simulated animated format without using web-site plug-in software.

8. A web-site in accordance with claim 6 wherein the data files are JPEG images.

9. A web-site in accordance with claim 6 wherein the plurality of data files are displayed in a sequence.

10. A web-site in accordance with claim 9 wherein JavaScript code is used to display the data files.

11. A web-site in accordance with claim 6 wherein the data files comprise a plurality of aircraft engine components arranged in different orientations with respect to each other.

12. A web-site in accordance with claim 6 wherein the interactive control panel further configured to display each individual data file in a non-animated format.

13. A web-based system comprising:

a client system comprising a browser;

a data storage device for storing a plurality of individually saved data files such that access to the plurality of data files is limited to authorized individuals; and a server system configured to be coupled to said client system and said database, said browser configured to display the data files from a web page that includes a viewer for displaying the plurality files in a simulated animated format, said browser further configured to permit an end-user to determine a sequential order of the data files, and to display a description of an object represented in the plurality of individually saved web-based data files on the control panel simultaneously with the simulated animated format.

14. A web-based system in accordance with claim 13 wherein the plurality of data files are a plurality of JPEG images.

15. A web-based system in accordance with claim 14 wherein said browser further configured to display the data files in a simulated animated format without using browser plug-in software.

16. A web-based system in accordance with claim 15 wherein the plurality of data files are arranged in a sequential order.

17. A web-based system in accordance with claim 15 wherein JavaScript code is used to display the data files.

18. A web-based system in accordance with claim 15 wherein said browser further configured to permit an end-user to control at least one of a speed of the animation display, and an operation of the animation display.

19. A web-based system in accordance with claim 15 wherein said browser further configured to display each data file individually in a non-animated format.

* * * * *